Aug. 16, 1949.  A. H. HANSEN  2,478,921
BROW ENGAGING EYEGLASS
Filed July 25, 1947
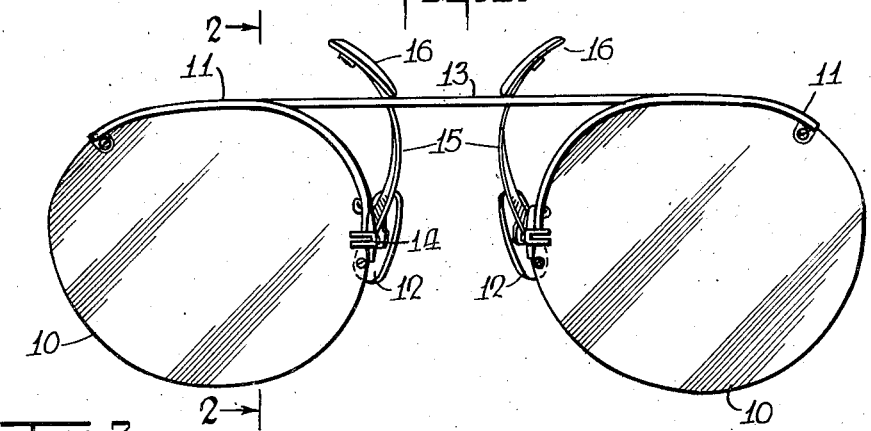
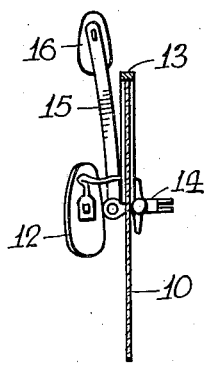
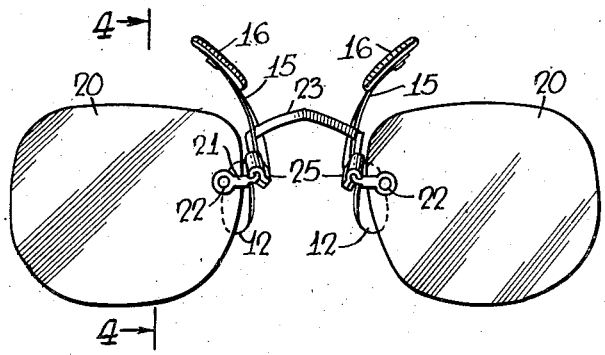
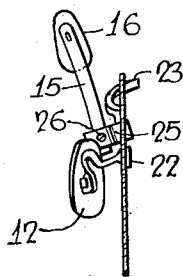
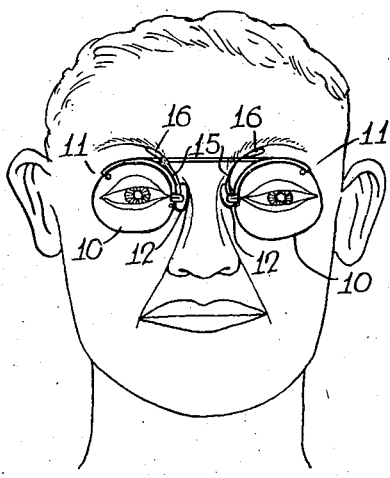
INVENTOR
Aage H. Hansen
BY
ATTORNEY Patented Aug. 16, 1949

2,478,921

UNITED STATES PATENT OFFICE 2,478,921

BROW ENGAGING EYEGLASS

Aage H. Hansen, New York, N. Y.

Application July 25, 1947, Serial No. 763,496

1 Claim. (Cl. 88—41)

This invention relates to improvements in eyeglass mountings and the like, and more particularly to a brow-bridge frame for holding the lenses in position over the nose of the wearer.

In the case of all aids to the vision it is of the utmost importance that the lenses should be held in firm and constant relation with the eyes.

In addition the field of vision should be as extensive as possible and all interference therewith should be reduced to the minimum.

Furthermore it is important that the lenses should occupy a plane as close to the eyes as possible without interfering with their natural movement within their orbits.

In order to meet these requirements a tendency has developed towards rimless mountings or frames. In the majority of conventional constructions, these mountings include a pair of temples for engaging about the ears of the wearer. Although these temples meet the requirement that the frames must retain the lenses firmly in properly aligned position with respect to the eyes, they obstruct the field of vision and in addition render the process of repeated removal and readjustments very cumbersome. For instance, when eyeglasses are used only temporarily for close reading, the temples constitute a great cause of irritation to the wearer.

For the foregoing reason many users of eyeglasses for only temporary close inspection, have used the so-called "pince-nez" type of mounting. This type of mounting, however, not only fails in the very essential requirement of holding the lenses firmly in aligned position, but exerts a very irritating pressure on the nose of the wearer which often causes headaches and other nauseous effects.

It is therefore among the objects of the present invention to provide an eyeglass mounting or frame which will retain the lenses firmly in alignment with respect to the eyes without the need of temples and which will relieve pressure irritation on the nose of the wearer.

Another object is to distribute the skin engaging parts of the frame over a larger area with a view to reduce the pressure on an individual spot.

A further specific object is to provide an eyeglass mounting which will utilize the orbit under frontal bone for support.

Other objects and advantages inherent in the invention will become apparent from the following specification taken in conjunction with the accompanying drawing which shows two different embodiments of the invention.

In the drawing:

Figure 1 is a front elevation showing the invention applied to a so-called "Oxford" type frame;

Figure 2 is a section along the line 2—2 of Figure 1;

Figure 3 is a front elevation of a modification showing the invention applied to a so-called "pince-nez" type of frame;

Figure 4 is a view taken on the lines 4—4 of Figure 3; and

Figure 5 shows the eyeglasses equipped with the mounting according to the invention adjusted in position on the wearer.

In terms of broad inclusion, the invention contemplates a pair of resilient members which will exert a yielding upward pressure against the superorbital bone by engaging adjacent the superorbital foramina, in combination with a pair of members which engage the upper narrowed portion of the nose.

Throughout the drawing the same reference characters are used to indicate the same part.

Referring in greater detail to the embodiment illustrated in Figure 1 of the drawing, the lenses 10 are mounted in the rims 11 and spaced apart by the bar 13. On the rims 11 are mounted the nose pads 12 so as to engage the upper narrowed portion of the nose. The nose pads are mounted rigidly to the rims so as to form a firm support against the sides of the nose of the wearer but they are usually articulately attached by the prongs 14 so that they may adjust themselves to the slanting surfaces of the nose.

This type of frame is conventionally known as an "Oxford" frame, but heretofore temples had always to be used to retain the lenses and frame in position. The necessity for these temples have been eliminated by the provision of two spring members 15 which are mounted rigidly to the rims 11 preferably together with the prongs 14 carrying the nose pads 12. These spring members extend in diverging upward directions and slightly inwardly towards the face of the wearer so as to engage the superorbital or frontal bone adjacent the superorbital foramina which provide a fleshy or soft skin surface for a firm grip. Furthermore, pressure in the region of the superorbital foramina will not cause any disagreeable sensation or irritation but on the contrary the slight pressure on the superobital nerve will produce a rather agreeable sensation.

For the best results, the springs members 15 should preferably have a curved contour so that they follow in general the contour of the nose, By reason of this curvature, a more uniform pressure will be exerted on the frontal bone in addition to providing a more esthetic appearance.

The spring members 15 are also provided with pads 16 which are articulately attached to the ends thereof so as to cause them to conform to the surface of the superorbital arch.

In the embodiment shown in Figure 1, the spring members 15 are mounted in the clamp 17, which have outwardly projecting knobs 18 to facilitate the adjusting and removal of the eyeglasses. It should be understood, however, that this particular manner of mounting is not essential to the invention and others may be resorted to as shown in Figures 3 and 4.

The embodiment shown in Figure 3 illustrates a "pince-nez" type of frame except that the invention has eliminated the necessity of the conventional nose clamps. The lenses 20 are held between the bars 21 and the bolts 22 which in turn are carried by the rigid nose bridge 23. The bridge is equipped with the conventional nose pads 12 as in the embodiment shown in Figure 1.

The spring members 15 equipped with the articulated pads 16 are adjustably mounted in the slot between the legs of the U-bent clamping members 25. A set screw 26 serves to tighten the spring members in the slot.

It will be understood that this disclosure is given by way of example and not by way of limitation. The invention lends itself to various expressions within the scope of the following claim.

What is claimed is:

A frame for eyeglasses and the like comprising a pair of lenses and a rigid bridge member interconnecting said lenses for holding them firmly in aligned relationship with respect to the eyes of the wearer, a pair of nose pads rigidly connected to said lenses for engaging opposite sides of the bridge of the nose of the wearer, a pair of spring members rigidly connected to the nose pad connections with the lenses, said spring members curving upwardly in diverging directions and the free ends thereof being provided with pads for engaging the superorbital foramina of the wearer when the eyeglasses are adjusted in position and exert yielding downward pressure against said nosepads.

AAGE H. HANSEN.

REFERENCES CITED

The following references are of record in the file of this patent:

UNITED STATES PATENTS

| Number | Name | Date |
|---|---|---|
| 833,624 | Pettinger | Oct. 16, 1906 |
| 957,071 | Laughlin | May 3, 1910 |
| 1,532,323 | Laughlin | Apr. 7, 1925 |

FOREIGN PATENTS

| Number | Country | Date |
|---|---|---|
| 27,552 | Great Britain | Nov. 26, 1909 |
| 164,277 | Great Britain | June 9, 1921 |
| 712,732 | France | July 27, 1931 |